United States Patent
Karau et al.

(10) Patent No.: US 6,848,421 B1
(45) Date of Patent: Feb. 1, 2005

(54) ENGINE CONTROL METHOD AND APPARATUS USING ION SENSE COMBUSTION MONITORING

(75) Inventors: Philip Allen Karau, Grand Blanc, MI (US); Michael Edward Baker, Grand Blanc, MI (US); Mahfuzur Rahman, Belleville, MI (US); Gerard Wladyslaw Malaczynski, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/662,099

(22) Filed: Sep. 12, 2003

(51) Int. Cl.⁷ .................................................. F02P 5/00
(52) U.S. Cl. ......................... 123/406.22; 123/406.28; 123/435
(58) Field of Search ................. 123/406.22, 406.28, 123/435, 494, 478, 480, 491, 434

(56) References Cited

U.S. PATENT DOCUMENTS

| | | | |
|---|---|---|---|
| 5,207,200 A | | 5/1993 | Iwata |
| 5,604,441 A | * | 2/1997 | Freese et al. ............... 324/663 |
| 5,675,072 A | | 10/1997 | Yasuda et al. |
| 5,875,759 A | | 3/1999 | Meyer et al. |
| 5,947,077 A | * | 9/1999 | Yonezawa et al. .......... 123/295 |
| 6,178,949 B1 | | 1/2001 | Kirwan et al. |
| 6,185,500 B1 | | 2/2001 | Ketterer et al. |
| 6,246,952 B1 | | 6/2001 | Honda |
| 6,263,727 B1 | * | 7/2001 | Butler, Jr. .................. 73/117.2 |
| 6,268,913 B1 | * | 7/2001 | Rising ........................ 356/326 |
| 6,283,102 B1 | | 9/2001 | Nelson et al. |
| 6,286,482 B1 | | 9/2001 | Flynn et al. |
| 6,318,152 B1 | * | 11/2001 | Hagihara et al. .......... 73/35.02 |
| 6,408,242 B1 | | 6/2002 | Tozzi |
| 6,427,662 B2 | | 8/2002 | Tanaya et al. |
| 6,520,166 B1 | * | 2/2003 | Karau et al. ................ 123/644 |

* cited by examiner

*Primary Examiner*—John T. Kwon
(74) *Attorney, Agent, or Firm*—Jimmy L. Funke

(57) ABSTRACT

A method and control system that directly determines combustion quality by measuring an ionization signal of each combustion event during initial engine operation is shown. The determined combustion quality is used to optimize engine performance for emissions and driveability by compensating various engine control parameters during initial engine operation, including starting. Compensation of engine control parameters may include changes to fuel delivery, spark ignition timing, and engine load. Any compensation of the engine control acts to ensure that a sufficient quantity of vaporized fuel is delivered to the engine to effectively start and operate the engine at the load level demanded by the engine, engine loads, and the operator.

16 Claims, 3 Drawing Sheets

ENGINE CONTROL METHOD AND APPARATUS USING ION SENSE COMBUSTION MONITORING

TECHNICAL FIELD

This invention pertains generally to an internal combustion engine control system, and more specifically to a method and apparatus to compensate for variations in combustion quality during initial engine operation.

BACKGROUND OF THE INVENTION

There is a need to be able to effectively control an internal combustion (IC) engine during initial engine operation, include starting, under a variety of unknown conditions, while meeting customer requirements for driveability and increasingly stringent government requirements for emissions performance. Conditions include use of fuels with a range of properties. The initial operation of the engine is also affected by various properties of intake air and the engine, including temperature, humidity, and remnants of fuel contained in the engine from previous operation. The fuel properties include vaporization pressure of the fuel, which is quantified using one of several indices, e.g. Reid Vapor Pressure (RVP) or Driveability Index (DI). Fuel refiners and distributors adjust fuel vaporization pressure to correspond to seasonal ambient temperatures in order to optimize cold start capability of IC engines in various geographic regions. The vaporization pressure is varied by shifting relative quantities of lower-, mid-, and heavier-weight hydrocarbon molecules contained in the fuel. The lower weight hydrocarbon molecules vaporize at lower temperatures, thus leading to more effective engine startability at low ambient temperatures. The fuel available may range in DI from under 1000 (highly volatile) in cooler areas to over 1250 (very stable) in hotter areas.

The fuel in a fuel tank may also change vaporization characteristics over time, through a process called 'weathering'. The lower-weight hydrocarbon molecules may evaporate in the fuel tank. Passenger cars and trucks have evaporative systems that capture and store the evaporated hydrocarbons in a carbon canister and subsequently consume them by purging the canister through the engine. In engine applications wherein there is no evaporative system, the lower weight molecules may instead be vented to the atmosphere. In any event, the evaporative characteristics of the remaining fuel changes, along with the suitability of the fuel for cold start operation.

Fuel quality changes with variations in base oil stock from which the fuel is refined, and additives provided by the refiners to enhance fuel performance and boost octane levels. For example, refiners add various types of alcohol to boost oxygenate levels in fuels. There are also aftermarket additives that are used by vehicle operators and service technicians to boost performance or clean fuel system components. The use of additives may affect the evaporative characteristics of the fuel and the heat potential, or combustion energy, of the fuel.

The properties of intake air of concern include temperature, humidity, and any other sources of variations between actual air mass and measured air mass that affect fueling and combustion quality of the engine during initial operation. The properties of the engine of concern include engine component wear, engine temperature, presence of deposits on cylinder walls and elsewhere, and other properties that affect the ability of an engine to perform in the manner in which it was developed and calibrated.

Engine manufacturers also have customer driveability requirements for stable engine starting and operation. To meet the driveability requirements, engine management systems may be calibrated so a sufficient amount of fuel is delivered to make the system robust to varying levels of fuel volatility. A typical approach to managing varying levels of fuel volatility is to calibrate the system with excess fuel to ensure good driveability. Use of excess fuel during initial operation may have the effect of increasing engine-out hydrocarbon and carbon monoxide emissions. Engine manufacturers must also comply with more stringent exhaust emissions regulations in the future. An important strategy in meeting the emissions regulations is to ensure that the engine runs at an air/fuel ratio that is at or near stoichiometry at the start of the engine, or soon thereafter. The strategy is necessary to minimize engine out emissions and also to provide an exhaust gas feedstream to a catalytic converter that allows the converter to perform at optimum levels.

Engine and vehicle manufacturers accomplish the balance between meeting customer requirements for stable operation and meeting emissions regulations several ways. This includes conducting extensive pre-production testing and development to create and optimize engine operating calibrations, adding hardware, and increasing additional functionality to existing hardware. Extensive testing and calibration is conducted during the engine development phase. Hardware such as air injection pumps may be added to assist in oxidizing engine emissions during initial engine operation, which includes engine start. The amount of precious metals (palladium, rhodium, and platinum) contained in the catalytic converter may be increased to improve effective conversion of unwanted emissions. Each of these methods adds complexity and cost to the vehicle or engine.

Several methods have been proposed to control engine performance based upon fuel quality and volatility by monitoring the engine during initial operation. These methods infer volatility from other measured parameters, including engine speed, cylinder pressure ratio, or exhaust gas temperature measurement. Examples of these methods are described in U.S. Pat. No. 6,283,102, entitled Fuel Identifier Algorithm, issued to Nelson on Sep. 4, 2001, U.S. Pat. No. 6,178,949, entitled Engine Control Having Fuel Volatility Compensation, issued to Kirwan on Jan. 30, 2001, and U.S. Pat. No. 5,875,759, entitled Method for Improving Spark Ignited Internal Combustion Engine Starting And Idling Using Poor Driveability Fuels, issued to Meyer on Mar. 2, 1999.

Each of these methods carries the disadvantage that they do not directly measure or compensate for variations in combustion quality, especially as affected by fuel volatility and fuel quality. Compensating for variation in combustion quality is especially important during initial operation of the engine, including a cold start. Therefore any compensation scheme may be skewed because of incorrect assumptions in the inference chain from the measured parameter to a useable parameter, i.e. combustion quality. Each method also requires varying levels of testing and evaluation during engine calibration and development to establish the inference chains and create calibration tables that may be used by an engine controller. Each method also may have to be regularly reset to a nominal value during the operation of the vehicle due to external changes for which the given method is unable to adjust, e.g. vehicle refueling with a different volatility of fuel. Each of the methods also carries the disadvantage that they do not provide compensation for fuel quality and volatility. Furthermore, each method is unable to compensate for performance variations between cylinders.

SUMMARY OF THE INVENTION

The present invention provides an improvement over conventional engine controls in that it provides a method and control system to determine combustion quality. The determined combustion quality is used to optimize engine performance for emissions and driveability by compensating various engine control parameters during initial engine operation, including starting. Compensation of engine control parameters may include changes to fuel delivery, spark ignition timing, and engine load. Any compensation of the engine control acts to ensure that a sufficient quantity of vaporized fuel is delivered to the engine to effectively start and operate the engine at the load level demanded by the engine, its loads, and the operator.

The invention is a method and control system for the internal combustion engine that comprises measuring an ionization signal of each combustion event during initial engine operation, and compensating at least one engine control parameter based upon combustion quality of individual combustion events derived from the ionization signal. Initial engine operation comprises the time from start of engine crank until intake valves exceed a predetermined temperature, which is estimated using a model contained in the controller. The initial engine operation may instead comprise the time from start of engine crank until commencement of closed loop air/fuel ratio control. Compensating the engine control parameter during initial engine operation preferably comprises adjusting fuel delivery by changing the fuel injector pulsewidth. There is preferably an index of combustion quality determined for each cylinder of the engine, and compensation of fuel injector pulsewidth is also cylinder-specific, based upon the index of combustion quality.

The invention also comprises a method for compensating for a variation in fuel quality during initial operation of the internal combustion engine using the ionization signal from combustion events during initial engine operation to compensate fuel delivery to the engine. The invention further comprises a method for improving combustion stability on the internal combustion engine during initial engine operation, comprising using the ionization signal from combustion events during initial engine operation to compensate fuel delivery to the engine.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
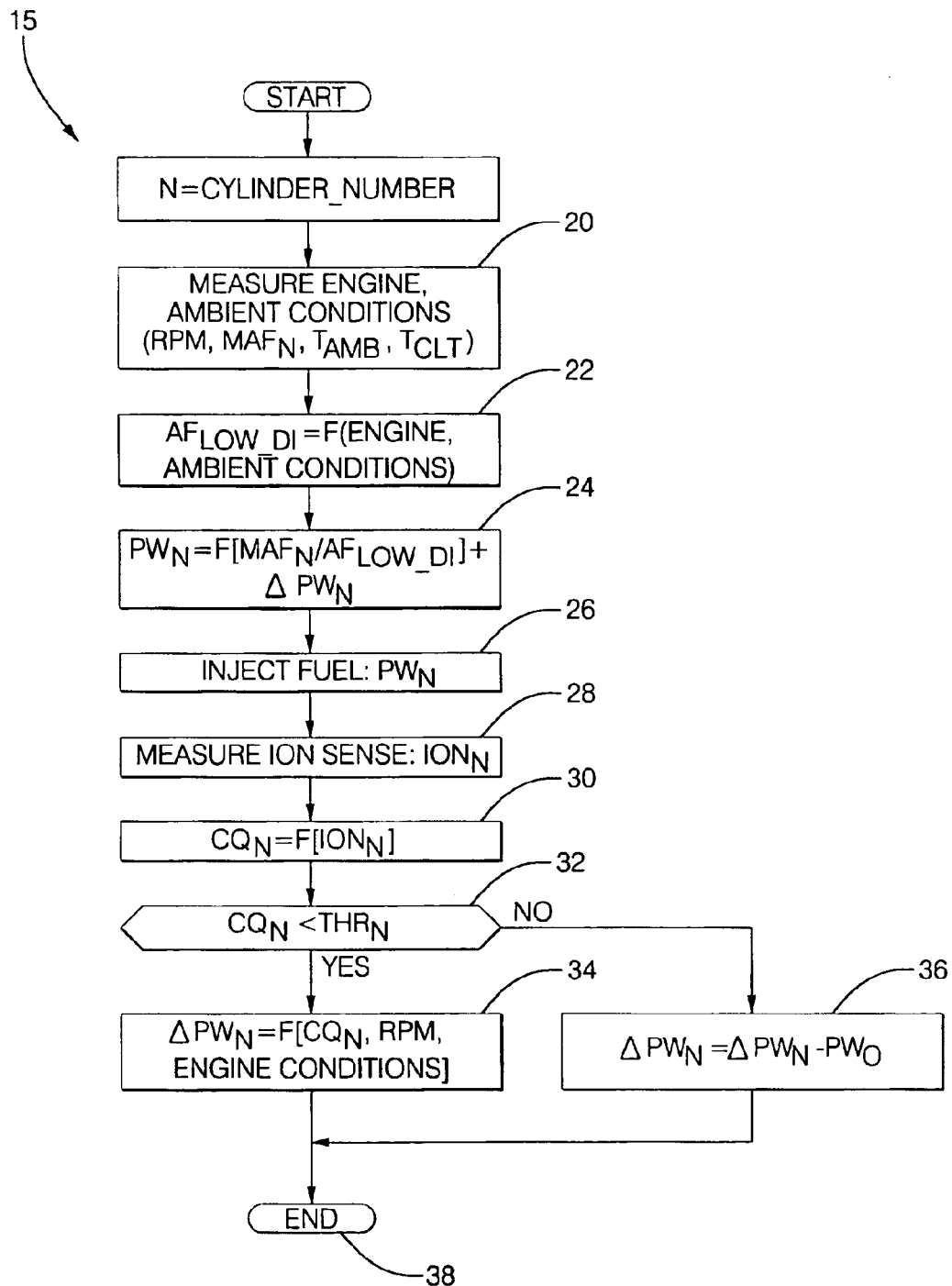
FIG. 1 is a flowchart, in accordance with the present invention.

The invention comprises a method and control system for controlling an internal combustion engine during initial engine operation based upon combustion quality. The preferred system includes the internal combustion engine and an electronic controller. The internal combustion engine includes one or more cylinders wherein stored energy of fuel is converted to power in the form of rotational and linear motion through a combustion process. An output of the engine is operably connected to a driveline, which transfers power to driveline and accessory; components. The operation of the internal combustion engine and driveline is known to one skilled in the art.

In this embodiment, the internal combustion engine is preferably a spark-ignition engine. The engine is comprised of a plurality of cylinders, each containing a piston operably attached to a crankshaft at a point eccentric to an axis of rotation of the crankshaft. There is a head at the top of each cylinder containing valves for intake and exhaust air and a spark plug. A combustion chamber is formed within each cylinder between the piston and the head. A combustion charge comprising a combination of air and fuel is inlet into each combustion chamber through the intake valve, and is ignited by the spark plug, according to predetermined conditions. The ignition of the combustion charge causes an increase in pressure in the combustion chamber, forcing the piston to move linearly along the length of the cylinder away from the head. The movement of the piston in turn causes the crankshaft to rotate. The crankshaft causes the piston to again move toward the head after the crankshaft has rotated to a furthest point of eccentricity. The operation of an internal combustion engine is well known to one skilled in the art.

The spark plug in each combustion chamber is a component of a spark ignition system. The spark ignition system is preferably comprised of an ignition module with a coil and ignition circuitry electrically connected to each of the spark plugs using high-tension spark plug wires. Each spark plug is inserted into the head with an operational end of the plug in the combustion chamber. Each spark plug serves dual functions, including being operable to ignite the combustion charge in each cylinder, and also being operable to sense an ionization signal resulting from the ignition of the combustion charge after each ignition event. The ignition module is preferably integrated into the controller and is operable to cause the spark plug to ignite each combustion charge and operable to monitor the ionization signal from each spark plug. Mechanization and operation of the spark-ignition system, including the ion-sense ignition system, are well known to one skilled in the art.

The internal combustion engine is preferably configured with other sensing devices operable to measure engine performance, and other output devices operable to control engine performance. The sensing devices may include, for example, an oxygen sensor or air/fuel ratio sensor for monitoring exhaust gas feedstream, a crankshaft sensor for measuring crankshaft position and speed, a manifold absolute pressure sensor, a throttle position sensor, a mass air flow sensor, an intake air temperature sensor, a coolant temperature sensor, among others. The output devices preferably include a fuel injection system including a plurality of fuel injectors operable to deliver fuel at or near each cylinder. The controller collects information from the sensing devices to determine engine performance parameters and controls the output devices, using control algorithms and calibrations internal to the controller.

The controller is preferably an electronic control module comprising a central processing unit that is signally electrically connected to volatile and non-volatile memory devices via one or more data buses. The controller is signally connected to the aforementioned sensing devices and operably connected to the aforementioned output devices. The controller preferably controls operation of the engine by collecting input from the sensing devices and controlling one or more of the output devices using control algorithms and calibrations internal to the controller. Each control algorithm may be executed during a preset loop cycle, wherein it is executed at least once each loop cycle. A loop cycle is typically executed each 3, 6, 15, 25 and 100 milliseconds during ongoing engine operation. A control algorithm may instead be event-driven, wherein an event such as a cylinder combustion event, a rotational position of the crankshaft, an engine cranking event, engine start, or open-loop engine operation causes execution of one or more control algorithms. The controller preferably samples the ionization signal during each combustion event of the engine, using the ignition module and each spark plug. Use of the controller to control the operation of the internal combustion engine is well known to one skilled in the art.

Initial engine operation comprises the period of time from start of engine crank until a determinable event occurs after the engine starts. The initial engine operation is typically divided into an engine cranking portion, a crank-to-run transition portion, and a run portion. The crank portion is defined by the actions of an operator starting the engine by cranking an electric starter, typically using an ignition key. The crank-to-run portion begins when at least one cylinder of the engine fires, and the engine moves from being driven by the electric starter to being self-driven, without assistance from the starter. The run portion begins when the engine is self-driven, but still may need compensation to maintain acceptable operation because the engine is not fully warmed up.

The determinable event that ends the initial engine operation may comprise commencement of closed-loop air/fuel ratio control, or when an intake valve exceeds a predetermined temperature. The controller typically operates the engine in the open-loop air/fuel ratio control mode during engine crank, and for a period of time thereafter. The controller typically enters closed-loop air/fuel ratio control mode when engine operating conditions permit. The engine operating conditions preferably include signal output from the exhaust gas sensor and other sensors, e.g. engine coolant temperature sensor. During the time the engine is operating in the open-loop control mode, the controller controls various engine output devices, including pulsewidth of each fuel injector and spark ignition timing, based upon input from other sensors and predetermined calibrations. The input from other sensors includes, for example, mass airflow (MAF), ambient air temperature ($T_{AIR}$), engine coolant temperature ($T_{CLT}$), engine crankshaft speed (RPM), and engine crankshaft position. The predetermined calibrations include, for example, fuel injector flow calibrations that translate a command to deliver a quantity of fuel to a cylinder to a pulsewidth for a fuel injector, and mass air flow calibrations. This is known to one skilled in the art.

When the determinable event that ends the initial engine operation comprises at least one intake valve exceeding a predetermined temperature, the controller includes at least one algorithm that is operable to estimate intake valve temperature based upon intake mass air flow $MAF_N$, and engine coolant temperature $T_{CLT}$, measured at engine start. Estimating intake valve temperature is described in detail in Maloney, P., *An Event-Based Transient Fuel Compensator with Physically Based Parameters, Society of Automotive Engineers* [SAE] 1999-01-0553 (1999), and is known to one skilled in the art. The predetermined temperature is preferably a single threshold value, and comprises an intake valve temperature level sufficient to atomize a substantial portion of the fuel injected into the cylinder. The predetermined temperature threshold is preferably determined through calibration and testing, and the calibration process is known to one skilled in the art.

Referring now to the drawings, wherein the showings are for the purpose of illustrating an embodiment of the invention only and not for the purpose of limiting the same, FIG. 1 shows a flowchart 15 that has been constructed in accordance therewith. The flowchart 15 comprises a first embodiment of an operating strategy and is preferably executed as a plurality of algorithms in the controller to control operation of the internal combustion engine. The controller preferably executes the operating strategy of the flowchart 15 during engine cranking and crank-to-run transition portions of the initial engine operation. The operating strategy of the flowchart 15 is preferably event-driven, based upon individual cylinder combustion events, although some individual algorithms may be executed during loop cycles. The invention comprises a system and method for controlling the internal combustion engine, and comprises: measuring the ionization signal of each combustion event in each cylinder during initial engine operation, determining an index of combustion quality based upon the ionization signal, and compensating, when necessary, at least one engine control parameter during the initial engine operation based upon the at least one index of combustion quality.

The operating strategy of the flowchart 15 includes determining engine and ambient conditions: (block 20); determining an air/fuel ratio, $AF_{LOW\_DI}$, based upon the determined engine and ambient conditions (block 22); calculating a fuel injector pulsewidth based upon the air/fuel ratio and the internal calibration, and compensating the fuel injector pulsewidth with a pulsewidth correction factor (block 24); injecting fuel (block 26); measuring an ionization signal during the subsequent corresponding combustion event for the cylinder (block 28); determining an index of combustion quality based upon the ionization signal (block 30); determining whether the index of combustion quality is less than a threshold (block 32); determining the fuel injector pulsewidth correction factor based upon the index of combustion quality, engine speed, and other engine conditions when the index of combustion quality is less than the threshold (block 34); or, decreasing, the fuel injector pulsewidth correction factor when the index of combustion quality exceeds the threshold (block 36).

The controller is operable to measure and determine engine and ambient conditions, including mass of air delivered to each cylinder ($MAF_N$, wherein "N" refers to a specific cylinder), ambient air temperature ($T_{AMB}$), engine coolant temperature ($T_{CLT}$), engine speed (RPM) and others, based on input from the aforementioned sensors (Block 20). Mass of air into the engine is preferably determined by direct measurement, using the mass air flow sensor. Mass of air into the engine may also be determined by estimation, which is typically based upon input from the manifold absolute pressure sensor, coolant temperature sensor, and a throttle position sensor (not shown). Calculation of the mass of air delivered to the engine is known to one skilled in the art.

The controller preferably determines the initial air/fuel ratio, $AF_{LOW\_DI}$, based upon the determined engine and ambient conditions (block 22). The controller typically determines $AF_{LOW\_DI}$ by selecting a value from a predetermined calibration table contained in the non-volatile memory device of the controller. Selection of the initial air/fuel ratio $AF_{LOW\_DI}$ is preferably based upon engine characteristics, including, whether the engine is in a cranking mode or running mode, the engine coolant temperature. $T_{CLT}$, and whether the engine is in a cold start mode, a warm restart mode, or a hot restart mode. An engine calibrator typically creates the predetermined calibration table during engine development phase, prior to start of regular production. The table is preferably created using a production-intent engine on a vehicle, wherein the vehicle is tested using fuel with a low level of volatility, such as California Phase II fuel. Calibration comprises testing the vehicle with the low volatility fuel over a range of engine coolant temperatures and starting modes, and optimizing the initial air/fuel ratio, $AF_{LOW\_DI}$, based upon engine stability and engine-out emissions. The calibration table or equation is created and stored in the non-volatile memory device of the controller for use during initial engine operation. The calibration process for determining an optimal air/fuel ratio during initial engine operation is known to one skilled in the art.

Fuel delivery to the combustion chamber of cylinder N is determined by calculating the injector pulsewidth $PW_N$, or injector opening time, corresponding to the amount of fuel necessary to create the initial air/fuel ratio $AF_{LOW\_DI}$. Fuel injector pulsewidth is typically determined based upon the mass of air $MAF_N$ delivered to the cylinder N, and divided by the initial air/fuel ratio, $AF_{LOW\_DI}$. In this invention, the pulsewidth correction factor, $\Delta PW_N$ is added to the fuel injector pulsewidth to compensate for degradation of combustion quality (block 24). Fuel is delivered to the combustion chamber of cylinder N (block 26), using the corresponding fuel injector by opening the injector for cylinder N for a pulsewidth of timelength $PW_N$. The pulsewidth correction factor $\Delta PW_N$ is typically set at zero the first time the flowchart 15 is executed during each initial engine operation, and is determined during each execution of the flowchart as described hereinafter. Determination of the amount of fuel to deliver to each combustion chamber using fuel injectors is known to one skilled in the art.

Figure 3:
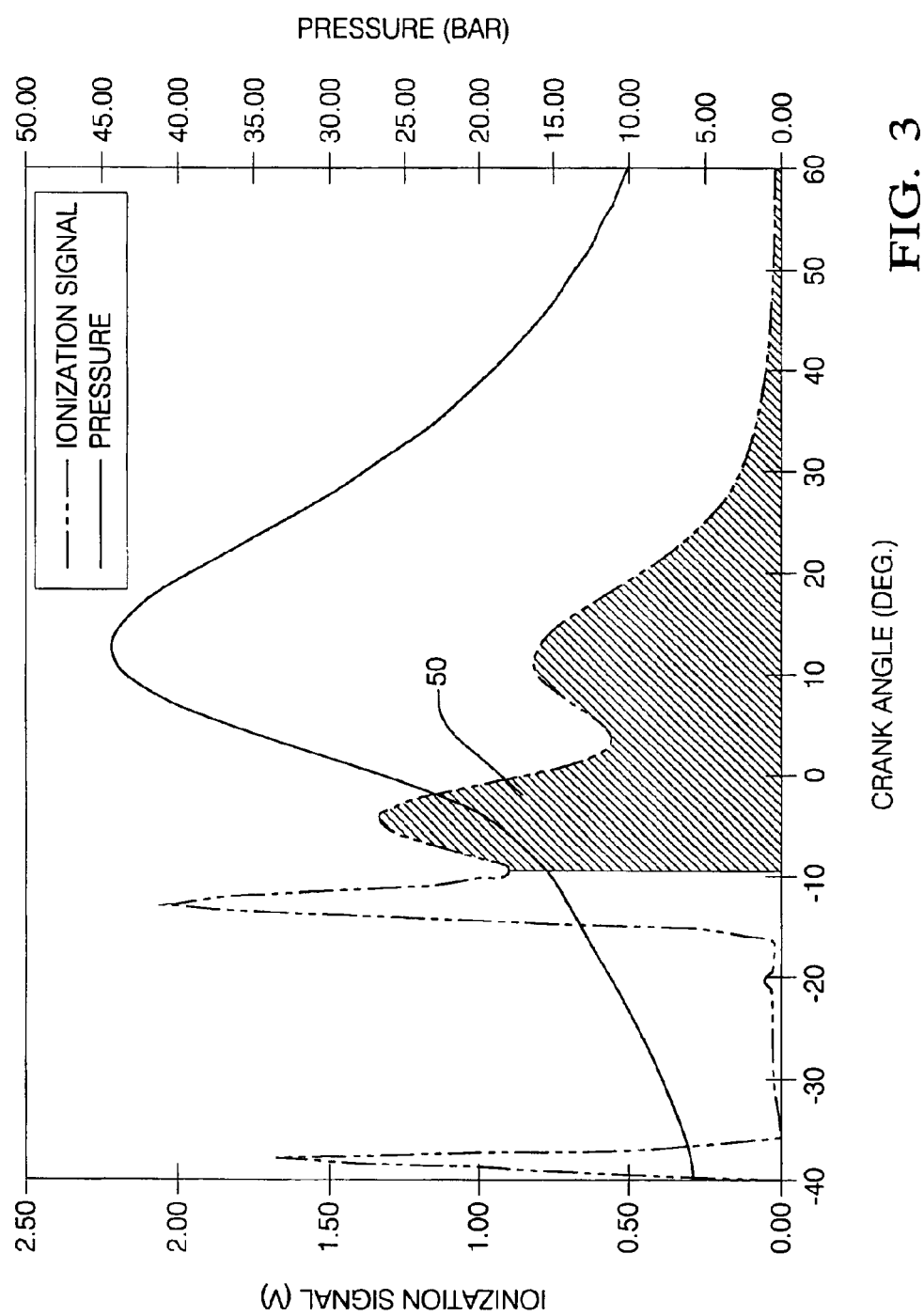
FIG. 3 is a graph, in accordance with the present invention.

The controller preferably measures the ion sense signal for the combustion event (block 28) with the ion sense ignition system previously described, and determines the index of combustion quality, $CQ_N$, based upon the measured ion sense signal. Determining the index of combustion quality $CQ_N$ based upon the measured ion sense signal is known to one skilled in the art, and may comprise measuring a time-integral of a portion of the ion sense signal. A representative graph of an ion sense signal measured during a combustion event is shown in FIG. 3. The index of combustion quality, $CQ_N$ is preferably determined by calculating the time-integral of the ionization signal during a combustion window 50, comprising a flame phase and a post-flame phase of the ionization signal, as shown in FIG. 3.

The index of combustion quality, $CQ_N$ is compared to a threshold (block 32). In this embodiment, there is an individual threshold for each cylinder N, referred to as $THR_N$. The controller determines the pulsewidth correction factor $\Delta PW_N$ based upon the combustion quality $CQ_N$, engine speed (RPM), whether the engine is in the cranking mode, the crank-to-run mode, or the running mode, and the other engine conditions when the index of combustion quality $CQ_N$ is less than $THR_N$ for specific cylinder N (block 34). The pulsewidth correction factor $\Delta PW_N$ is preferably applied in steps, wherein each step corresponds to a subsequent cylinder event for the given cylinder N, and the pulsewidth correction factor $\Delta PW_N$ for each subsequent step is cumulative. Each step may vary from as low as 2% of the pulsewidth when in the running mode to greater than 5% of the pulsewidth during cranking mode and crank-to-run mode. The cumulative pulsewidth correction factor $\Delta PW_N$ may result in an increase as high as 80% during the cranking and crank-to-run modes when the index of combustion quality remains low and other engine conditions indicate that the engine may stall. Actual values for each step of the pulsewidth correction factor $\Delta PW_N$ are engine-dependent, and determined during engine calibration, prior to start of regular production. When the index of combustion quality, $CQ_N$ is greater than $THR_N$, and other engine performance characteristics are acceptable, the controller may reduce the pulsewidth correction factor $\Delta PW_N$ by a predetermined amount, typically around 2% (block 36). The reduction of the pulsewidth correction factor $\Delta PW_N$ is intended to optimize fueling, and reduce overfueling. The controller subsequently increases the pulsewidth correction factor $\Delta PW_N$ when combustion quality again falls below the threshold. Each correction factor is preferably stored in the controller for use during the subsequent cylinder event for that specific cylinder. The correction factor $\Delta PW_N$ may also be stored for using during subsequent initial operating events of the engine.

Figure 2:
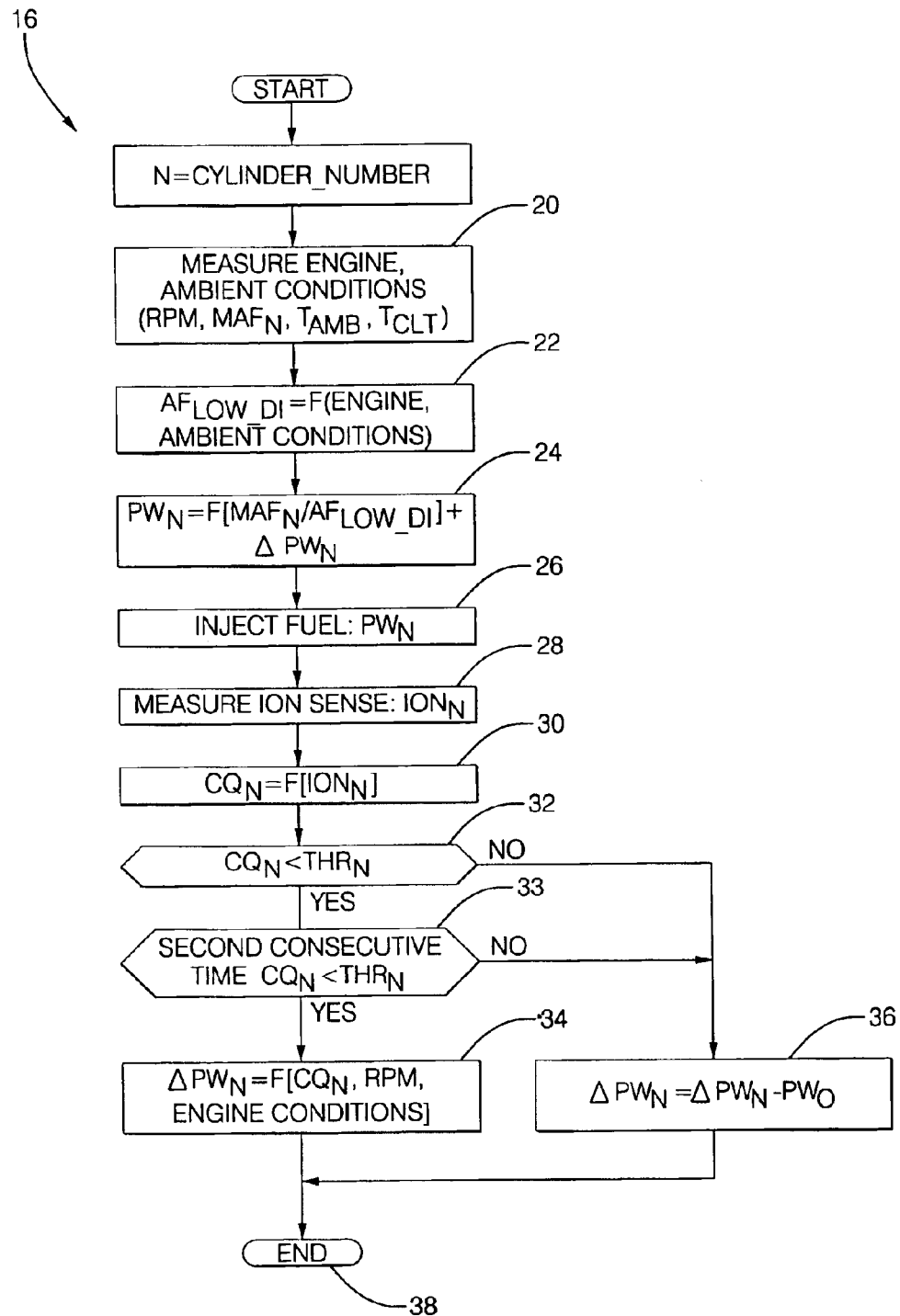
FIG. 2 is a second flowchart, in accordance with the present invention.

Referring now to FIG. 2 a flowchart 16, comprising a second embodiment of the operating strategy is shown, and is also preferably executed as a plurality of algorithms in the controller to control operation of the internal combustion engine. The controller preferably executes the operating strategy of the flowchart 16 during the engine run portion of the initial engine operation. The operating strategy of the flowchart 16 is preferably event-driven, based upon individual cylinder combustion events, although some individual algorithms may be executed during loop cycles. The operating strategy of the flowchart 16 includes determining engine and ambient conditions (block 20); determining the air/fuel ratio, $A_{FLOW\_DI}$, based upon the determined engine and ambient conditions (block 22); calculating the fuel injector pulsewidth based upon the air/fuel ratio and the correction factor (block 24); injecting fuel (block 26); measuring the ionization signal during the combustion event for the cylinder (block 28); determining the index of combustion quality based upon the ion signal (block 30); determining whether the index of combustion quality is less than threshold $THR_N$ for two consecutive combustion events in the specific cylinder (blocks 32 and 33); and determining the fuel injector pulsewidth correction factor based upon the index of combustion quality, engine speed, and other engine conditions when the index of combustion quality is less than the threshold $THR_N$ for two consecutive combustion events for the specific cylinder (block 34). The magnitude of a single pulsewidth correction factor of an individual fuel injector is typically about 2% of the pulsewidth. The fuel injector pulsewidth correction is decreased by about 2% of the pulsewidth when the index of combustion quality exceeds the threshold $THR_N$ for a predetermined number of combustion events after a correction (block 36).

The invention has been described with specific reference to the preferred embodiments and modifications thereto. Further modifications and alterations may occur to others upon reading and understanding the specification. It is intended to include all such modifications and alterations insofar as they come within the scope of the invention. One specific modification includes controlling other engine output parameters aside from fuel delivery, such as spark timing or parasitic engine loads. Another modification includes choosing whether to store or erase the correction factors $\Delta PW_N$ for use during a subsequent engine-starting event. Another modification includes implementing the pulsewidth correction factor $\Delta PW_N$ as a multiplier, rather than as an addend, which is shown in the present invention. It is also understood that this invention may be executed on engine types other than conventional spark-ignition internal combustion engines, wherein those engines are mechanized to measure ionization signal of a combustion event. For example, a compression-ignition engine may capture ionization signal data from an in-cylinder glow plug. Other engines wherein the invention may be applied, but not described in detail include, for example, Wankel engines, floating piston engines, and homogeneous-charge compression-ignition engines.

Having thus described the invention, it is claimed:

1. A method for controlling an internal combustion engine, comprising:

measuring an ionization signal of at least one combustion event in at least one cylinder of the internal combustion engine during initial engine operation;

determining at least one index of combustion quality based upon the ionization signal; and, adjusting pulsewidth of at least one fuel injector during the initial engine operation based upon the at least one index of combustion quality.

2. The method of claim 1, wherein the initial engine operation comprises a time from start of engine crank until at least one intake valve exceeds a predetermined temperature.

3. The method of claim 2, wherein the predetermined temperature comprises a temperature sufficient to atomize a substantial portion of fuel injected into the internal combustion engine near the at least one cylinder.

4. The method of claim 1, wherein the initial engine operation comprises a time from start of engine crank until commencement of closed loop air/fuel ratio control.

5. The method of claim 1, wherein determining the at least one index of combustion quality based upon the ionization signal comprises determining a plurality of indexes of combustion quality, wherein each index of the plurality of indexes of combustion quality corresponds to one of the cylinders of the internal combustion engine.

6. The method of claim 5, wherein compensating at least one engine control parameter during initial engine operation based upon the at least one index of combustion quality comprises adjusting fuel injector pulsewidth of the one of the cylinders based upon the at least one index of the plurality of indexes of combustion quality that corresponds to the one of the cylinders.

7. The method of claim 1, wherein compensating at least one engine control parameter during the initial engine operation based upon the at least one index of combustion quality comprises controlling at least one parasitic engine load.

8. The method of claim 1, wherein compensating at least one engine control parameter during the initial engine operation based upon the at least one index of combustion quality comprises adjusting spark ignition timing to the at least one cylinder of the internal combustion engine.

9. The method of claim 1, wherein determining the at least one index of combustion quality based upon the ionization signal comprises calculating a time-integral of at least a portion of each measured ionization signal of at least one combustion event in at least one cylinder of the internal combustion engine during the initial engine operation.

10. A method for compensating for a variation in fuel quality during initial operation of an internal combustion engine, comprising:

measuring an ionization signal of at least one combustion event in at least one cylinder of the internal combustion engine during initial engine operation;

determining at least one index of combustion quality based upon the ionization signal; and, adjusting pulsewidth of at least one fuel injector during the initial engine operation based upon the at least one index of combustion quality.

11. A method for improving combustion stability on an internal combustion engine during initial engine operation, comprising:

measuring an ionization signal of at least one combustion event in at least one cylinder of the internal combustion engine during the initial engine operation;

determining at least one index of combustion quality based upon the ionization signal; and, adjusting pulsewidth of at least one fuel injector during the initial engine operation based upon the at least one index of combustion quality.

12. A system to control an internal combustion engine during initial operation, comprising:

an ion sense device operable to measure an ionization signal in at least one cylinder of the internal combustion engine during initial operation; and, a controller, signally connected to the ion sense device, and, operable to adjust pulsewidth of at least one fuel injector of the internal combustion engine;

wherein the controller is operable to:

determine at least one index of combustion quality for at least one cylinder based upon the measured ionization signal from the ion sense device, and, adjust pulsewidth of the at least one fuel injector of the internal combustion engine based upon the at least one index of combustion quality.

13. The system of claim 12, wherein the initial engine operation comprises the period of time from start of engine crank until at least one intake valve exceeds a predetermined temperature.

14. The system of claim 12 wherein the internal combustion engine comprises a spark ignition engine.

15. The system of claim 12, wherein the internal combustion engine comprises a compression ignition engine.

16. The system of claim 15, wherein the ion sense device comprises a glow plug operable to sense ionization current in at least one cylinder of the internal combustion engine.

* * * * *